United States Patent [19]

Murai et al.

[11] Patent Number: 5,760,303
[45] Date of Patent: Jun. 2, 1998

[54] VIBRATING GYROSCOPE HAVING A CONSTANT DETECTING SENSITIVITY

[75] Inventors: Yutaka Murai; Akira Kumada; Takeshi Nakamura, all of Nagaokakyo, Japan

[73] Assignee: Murata Manufacturing Co. Ltd., Kyoto-fu, Japan

[21] Appl. No.: 753,903

[22] Filed: Dec. 3, 1996

Related U.S. Application Data

[63] Continuation of Ser. No. 350,176, Nov. 30, 1994, abandoned.

[30] Foreign Application Priority Data

Dec. 3, 1993 [JP] Japan ................... 5-339366

[51] Int. Cl.[6] ......................................... G01P 3/44
[52] U.S. Cl. ......................................... 73/504.12
[58] Field of Search .................... 73/504.12, 504.13, 73/504.14, 504.15, 504.16; 310/316, 324, 327, 329

[56] References Cited

U.S. PATENT DOCUMENTS

| | | | |
|---|---|---|---|
| 4,479,098 | 10/1984 | Watson | 310/318 |
| 4,671,112 | 6/1987 | Kimura et al. | 73/504.16 |
| 5,014,554 | 5/1991 | Terada et al. | 73/504.16 |
| 5,049,776 | 9/1991 | Ogawa | 310/316 |
| 5,197,331 | 3/1993 | Oikawa | 73/504.12 |
| 5,216,315 | 6/1993 | Terada et al. | 73/504.16 |
| 5,349,857 | 9/1994 | Kasanami et al. | 73/504.14 |
| 5,408,876 | 4/1995 | Macy | 73/504.16 |

FOREIGN PATENT DOCUMENTS

4334736A1  4/1994  Germany .

Primary Examiner—Christine K. Oda
Attorney, Agent, or Firm—Nikaido Marmelstein Murray & Oram LLP

[57] ABSTRACT

A vibrating gyroscope 10 includes a vibrator 12 which has a regular triangular prism-shaped vibrating body 14 and piezoelectric elements 16a, 16b and 16c formed on side faces of the vibrating body 14. The piezoelectric elements 16a, 16b and 16c having approximately same temperature characteristics are used. An oscillation circuit 26 is connected between the piezoelectric elements 16a, 16b and the piezoelectric element 16c. The piezoelectric elements 16a and 16b are connected to a differential amplifying circuit 28, and the differential amplifying circuit 28 is connected to a detecting circuit 30. An output signal of the piezoelectric element 16c for feedback is half-wave rectified by a half-wave rectification circuit 32, and smoothed by a smoothing circuit 34. An output signal of the smoothing circuit 34 is supplied to an automatic gain control circuit 36, and a gain of the detecting circuit 30 is controlled according to the input signal of the automatic gain control circuit 36.

6 Claims, 3 Drawing Sheets

VIBRATING GYROSCOPE HAVING A CONSTANT DETECTING SENSITIVITY

This application is a continuation of application Ser. No. 08/350,176 filed Nov. 30, 1994, abandoned.

BACKGROUND OF THE INVENTION

1. Field of the Invention

The present invention relates to a vibrating gyroscope, and particularly to a vibrating gyroscope for detecting a rotational angular velocity by utilizing a bending vibration of a prism-shaped vibrating body.

2. Description of the Prior Art

FIG. 4 is an illustrative view showing an example of a conventional vibrating gyroscope. A vibrating gyroscope 1 includes a vibrator 2. The vibrator 2 includes a vibrating body 3 having, for example, a regular triangular prism shape. Piezoelectric elements 4a, 4b and 4c are formed respectively on side faces of the vibrating body 3. An oscillation circuit 5 is connected between the piezoelectric elements 4a, 4b and the piezoelectric element 4c. The piezoelectric elements 4a and 4b are used for driving to generate a bending vibration to the vibrating body 3, and for detecting to obtain a signal corresponding to a rotational angular velocity. The piezoelectric element 4c is used for feedback to the oscillation circuit 5, when the vibrating body 3 is driven. The piezoelectric elements 4a and 4b are connected to a differential amplifying circuit 6. An output signal of the differential amplifying circuit 6 is detected by a detecting circuit 7.

In the vibrating gyroscope 1, the vibrating body 3 bends and vibrates in a direction perpendicular to the face of the piezoelectric element 4c by a signal of the oscillation circuit 5. At this time, input signals to the differential amplifying circuit 6 are the same signal, and an output signal is not obtained from the differential amplifying circuit 6. When the vibrating body 3 rotates on its axis, a vibrating direction of the vibrating body 3 changes by a Coriolis force. Thus, a difference is produced between the output signals of the piezoelectric elements 4a and 4b, and the difference of the output signals is obtained from the differential amplifying circuit 6. The output signal of the differential amplifying circuit 6 is detected by a detecting circuit 7. Since an output signal of the detecting circuit 7 corresponds to a rotational angular velocity, a rotational angular velocity supplied to the vibrating gyroscope 1 can be detected by measuring the output signal of the detecting circuit 7.

However, in the conventional vibrating gyroscope, there is a case that the output signals of the piezoelectric elements change due to a variation of circumferential temperature. When the output signals change, a rotational angular velocity can not be detected accurately. In order to correct the changed output signals, a sensitivity of the vibrating gyroscope is adjusted by using a temperature characteristics of a thermistor or a thermo-sensitive resistor. However, in such case, the vibrating gyroscope must be measured many times in order to select a preferable thermistor to be used. In the case that the output signals change by a variation of vibration characteristics of the vibrator due to aging, it is impossible to correct the changed signals with the thermistor.

SUMMARY OF THE INVENTION

It is, therefore, the primary object of the present invention to provide a vibrating gyroscope which has a constant detecting sensitivity even when there is a variation of circumferential temperature or vibrating characteristics of the vibrator.

The present invention is directed to a vibrating gyroscope comprising a prism-shaped vibrating body, plural piezoelectric elements formed on side faces of the vibrating body and having approximately same temperature characteristics, an oscillating circuit for generating a vibration to the vibrating body, a detecting circuit for detecting a signal obtained from the piezoelectric element to which a signal from the oscillation circuit is supplied, and an automatic gain control circuit for controlling a gain of the detecting circuit according to an output signal of the piezoelectric element for feedback to the oscillation circuit.

Since plural piezoelectric elements have approximately same temperature characteristics, output signals of the piezoelectric elements change similarly by a variation of circumferential temperature. By controlling a gain of the detecting circuit according to the output signal of the piezoelectric element for feedback, the output signal of the piezoelectric element which has approximately same temperature characteristics with the piezoelectric element for feedback can be corrected.

When a vibration characteristics of the vibrator changes due to aging, output signals of the piezoelectric elements which are formed on the same vibrating body show the similar changing tendency. Therefore, by controlling the gain of the detecting circuit according to the output signal of the piezoelectric element for feedback, the output signal of the other piezoelectric element can be corrected.

According to the present invention, the changed output signal due to the variation of circumferential temperature can be corrected by using piezoelectric elements having approximately same temperature characteristics. Even when the vibrating characteristics of the vibrator changes due to aging, the changed output signal of the piezoelectric element can be corrected. Therefore, the vibrating gyroscope whose detecting sensitivity scarcely changes can be obtained, and a rotational angular velocity can be detected accurately.

The above and further objects, features, aspects and advantages of the present invention will be more fully apparent from the following detailed description with the accompanying drawings.

DESCRIPTION OF THE PREFERRED EMBODIMENTS

Figure 1:
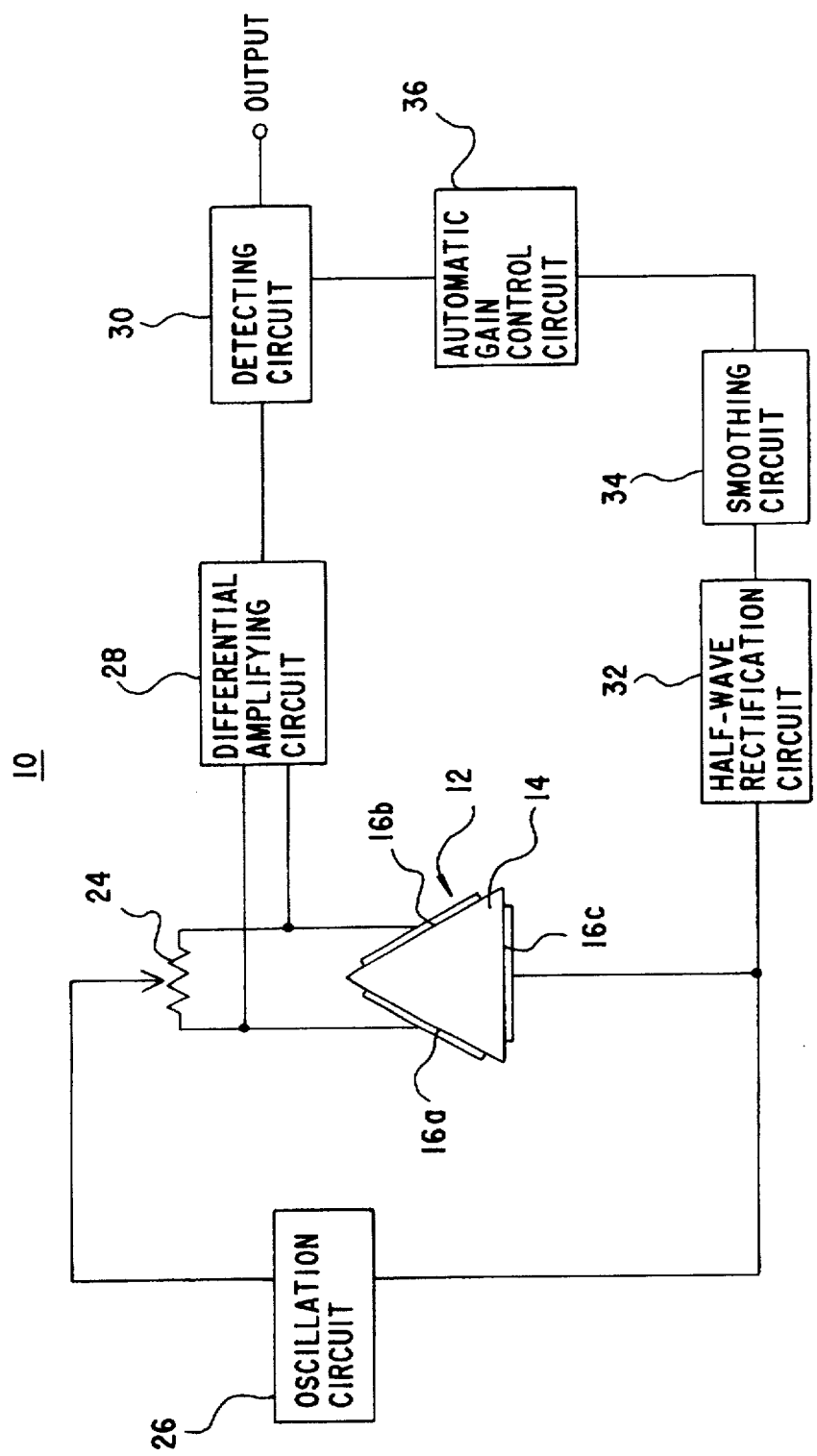
FIG. 1 is an illustrative view showing an embodiment of the present invention.
Figure 2:
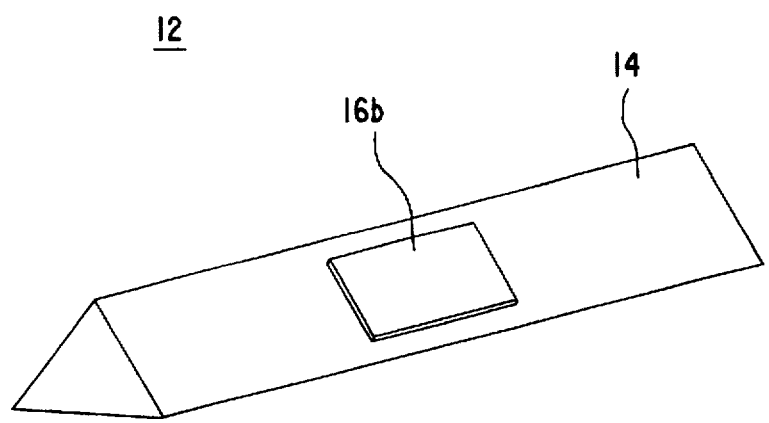
FIG. 2 is a perspective view showing a vibrator of the vibrating gyroscope of FIG. 1.

FIG. 1 is an illustrative view showing an embodiment of the present invention. A vibrating gyroscope 10 includes a vibrator 12. As shown in FIG. 2, the vibrator 12 includes a vibrating body 14 having, for example, a regular triangular prism shape. The vibrating body 14 is formed with materials that generates a mechanical vibration such as elinver, iron-nickel alloy, quartz, glass, crystal, ceramics or the like.

Figure 3:
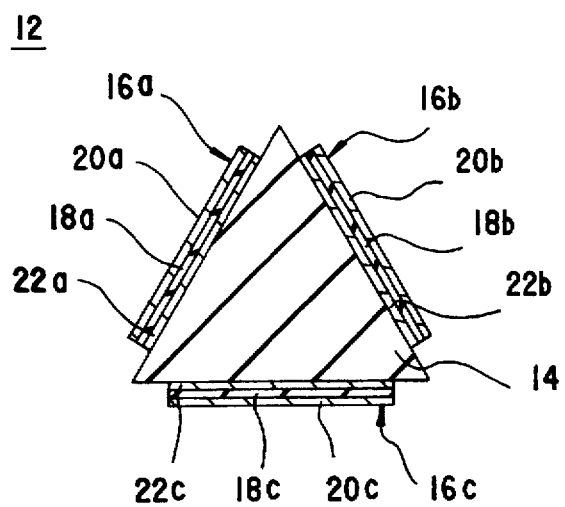
FIG. 3 is a sectional view showing the vibrator of FIG. 2.
Figure 4:
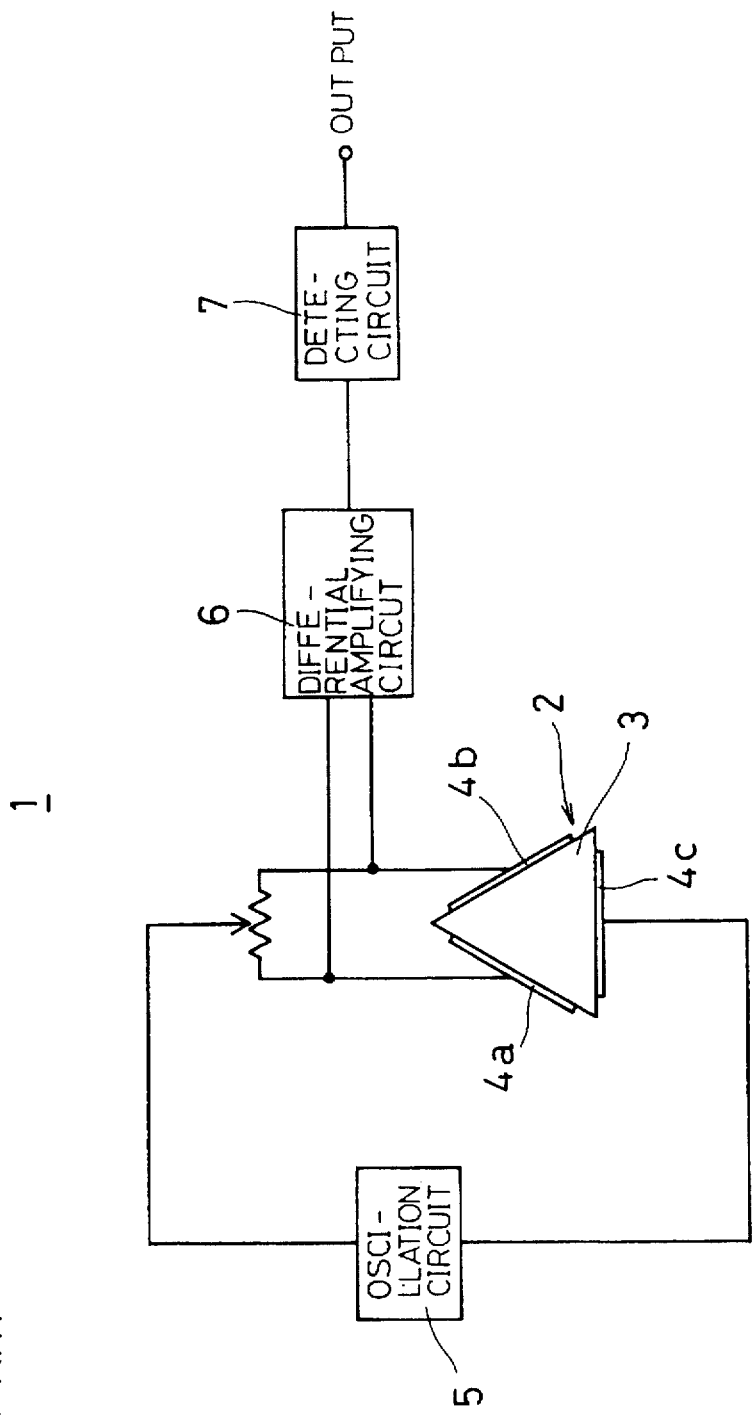
FIG. 4 is an illustrative view showing a conventional vibrating gyroscope.

Piezoelectric elements 16a, 16b and 16c are formed on side faces of the vibrating body 14 as shown in FIG. 3. The piezoelectric element 16a includes a piezoelectric plate 18a made of, for example, piezoelectric ceramics. Electrodes 20a and 22a are formed on both faces of the piezoelectric plate 18a. One electrode 22a is bonded to the vibrating body 14. Similarly, the piezoelectric elements 16b and 16c include piezoelectric plates 18b and 18c, and electrodes 20b, 22b and electrodes 20c, 22c are formed on both faces of respective piezoelectric plates 18b, 18c. One electrodes 22b and 22c of the piezoelectric elements 16b and 16c are bonded to the vibrating body 14. The piezoelectric elements 16a and 16b are used for driving to generate a bending vibration to the vibrating body 14, and for detecting to obtain a signal corresponding to a rotational angular velocity. The piezoelectric element 16c is used for feedback when a bending vibration is generated to the vibrating body 14. The piezoelectric elements 16a, 16b and 16c having approximately same temperature characteristics are used.

A variable resistor 24 is connected between the piezoelectric elements 16a and 16b. An oscillation circuit 26 is connected between the variable resistor 24 and the piezoelectric element 16c. The vibrating body 14 bends and vibrates in a direction perpendicular to the face of the piezoelectric element 16c by a signal from the oscillating circuit 26. The piezoelectric elements 16a and 16b are connected to a differential amplifying circuit 28. An output signal of the differential amplifying circuit 28 is detected by a detecting circuit 30. The detecting circuit 30 includes, for example, a wave detecting circuit and an amplifying circuit, and further includes a smoothing circuit.

The piezoelectric element 16c for feedback is connected to a half-wave rectification circuit 32. A signal rectified by the half-wave rectification circuit 32 is smoothed by a smoothing circuit 34. An output signal of the smoothing circuit 34 is supplied to an automatic gain control circuit 36, and a gain of the detecting circuit 30 is controlled by the automatic gain control circuit 36. The automatic gain control circuit is connected in parallel to the oscillation circuit.

In the vibrating gyroscope 10, the vibrating body 14 bends and vibrates by the signal from the oscillation circuit 26. When the vibrating body 14 does not rotate, the signals supplied to the differential amplifying circuit 28 are the same signal, and an output signal is not obtained from the differential amplifying circuit 28. In this situation, when the vibrating body 14 rotates on its axis, a vibrating direction of the vibrating body 14 changes due to a Coriolis force. A difference is produced between output signals of the piezoelectric elements 16a and 16b, and the difference is obtained from the differential amplifying circuit 28. The signal obtained from the differential amplifying circuit 28 is detected by the detecting circuit 30. Since the output signal of the detecting circuit 30 corresponds to a rotational angular velocity, the rotational angular velocity can be detected by measuring the output signal of the detecting circuit 30.

An output signal of the piezoelectric element 16c for feedback is half-wave rectified by the half-wave rectification circuit 32. The half-wave rectified signal is smoothed by the smoothing circuit 34. An output signal of the smoothing circuit 34 is supplied to the automatic gain control circuit 36, and the automatic gain control circuit 36 controls a gain of the detecting circuit 36 according to the input signal of the automatic gain control circuit 36. For example, when the output signal of the piezoelectric element 16c for feedback becomes large, and the output signal of the smoothing circuit 34 becomes large, the detecting circuit 30 is controlled so as to reduce its gain by the automatic gain control circuit 36. When the output signal of the piezoelectric element 16c for feedback becomes small, and the output signal of the smoothing circuit 34 becomes small, the detecting circuit 30 is controlled so as to increase its gain by the automatic gain control circuit 36.

In the vibrating gyroscope 10, since the piezoelectric elements having approximately same temperature characteristics are used as the piezoelectric elements 16a, 16b and 16c, the piezoelectric elements 16a, 16b and the piezoelectric element 16c shows similar characteristic variation when circumferential temperature changes. Thus, the output signals of the piezoelectric elements 16a, 16b and 16c change similarly. Therefore, by controlling the gain of the detecting circuit 30 according to the output signal of the piezoelectric element 16c for feedback, an error due to the characteristic variation of the piezoelectric elements 16a and 16b can be corrected.

When the vibration characteristics of the vibrator 12 changes due to aging, since the piezoelectric elements 16a, 16b and 16c are bonded on the same vibrating body 14, the output signals show the similar changing tendency. In this case too, by controlling the gain of the detecting circuit 30 according to the output signal of the piezoelectric element 16c for feedback, the changed output signals of the piezoelectric elements 16a and 16b can be corrected. Similarly, even when Q of the vibrator changes due to magnetization of the vibrator 12, the constant sensitivity can be obtained.

In the vibrating gyroscope 10, the sensitivity variation of the rotational angular velocity due to the variation of circumferential temperature or vibration characteristics of the vibrator can be prevented. Therefore, according to the present invention, the vibrating gyroscope having constant detecting sensitivity can be obtained. In the above embodiment, though the vibrating body having a regular triangular prism shape is used, the vibrating body having other prism shape such as rectangular prism shape or circular prism shape may be used. By controlling the gain of the detecting circuit according to the output signal of the piezoelectric element for feedback, the vibrating gyroscope having constant sensitivity can be obtained.

While the present invention has been particularly described and shown, it is to be understood that such description is used merely as an illustration and example rather than limitation, and the spirit and scope of the present invention is determined solely by the terms of the appended claims.

What is claimed is:

1. A vibrating gyroscope comprising:
   a vibrating body;
   a plurality of piezoelectric elements formed on said vibrating body and having approximately same temperature characteristics, one of said plurality of piezoelectric elements outputting a feedback signal;
   an oscillating circuit connected in parallel to said vibrating body, said oscillating circuit generating a vibration to said vibrating body, said feedback signal being supplied to said oscillating circuit;
   a detecting means for detecting a signal, corresponding to rotational angular velocity, obtained from piezoelectric elements of said plurality of piezoelectric elements to which a signal from said oscillating circuit is supplied; and
   an automatic gain control means having an output end connected to said detecting means, said automatic gain control means and said detecting means connected in parallel to said vibrating body said automatic gain control means for controlling a gain of said detecting means according to said feedback signal from said one of said plurality of piezoelectric elements.

2. A vibrating gyroscope in accordance with claim 1, wherein said automatic gain control means further comprises a half-wave rectification circuit half-wave rectifying the feedback signal of said one of said piezoelectric elements for feedback, and a smoothing circuit smoothing an output signal of said half-wave rectification circuit.

3. A vibrating gyroscope in accordance with claim 1, wherein said vibrating body is formed in a regular triangular prism shape, and three piezoelectric elements are formed respectively on three side faces of said vibrating body.

4. A vibrating gyroscope in accordance with claim 3, wherein said detecting means further comprises a differential amplifying circuit obtaining a difference of output signals between two of said piezoelectric elements.

5. A vibrating gyroscope in accordance with claim 2, wherein said vibrating body is formed in a regular triangular prism shape, and three piezoelectric elements are formed respectively on three side faces of said vibrating body.

6. A vibrating gyroscope in accordance with claim 5, wherein said detecting means further comprises a differential amplifying circuit obtaining a difference of output signals between two of said piezoelectric elements.

* * * * *